United States Patent Office 2,980,587
Patented Apr. 18, 1961

2,980,587

DRY STABLE VITAMIN A AND/OR D-PREPARATION AND METHODS OF PRODUCING SAME

Evert Jan Ten Ham, Weesp, Netherlands, and Peder Lund Kring, Virum, Denmark, assignors, by mesne assignments, to North American Philips Company, Inc., New York, N.Y., a corporation of Delaware No Drawing. Filed Mar. 20, 1956, Ser. No. 572,613

Claims priority, application Denmark Mar. 21, 1955

14 Claims. (Cl. 167—81)

Various methods are known for the production of dry vitamin preparations which are soluble in fat or in water.

The first-mentioned preparations may, for example, be provided by dividing a mixture of a wax-like material, a meal and a fat soluble vitamin into, solid spherical particles, for example, by spraying the liquid mixture through a small aperture.

Dry and free flowing water-soluble vitamin preparations may be produced by spraying an aqueous emulsion of the vitamins, dissolved in oil, containing, in its homogeneous phase, a jellifiable colloid, into a hot gas. By this means the particles produced are dried immediately after they have been formed. As an alternative, the emulsion may be sprayed in a gas at room temperature, the particles being subsequently dried; or the emulsion may be dispersed in an oil which does not mix with the emulsion, for example in castor oil. In the latter case the dispersed emulsion is separated from the oil by filtering off the solidified emulsion particles or by extraction of the oil by a suitable solvent, or by a combination of the two methods. It is then often desirable to dry the particles obtained, which may be carried out with warm air.

In order to enhance the optimum keeping quality of these dry vitamin preparations which are soluble in fat or in water, as a rule one or more antioxidants or synergists are added to the vitamins. It has been suggested to use for this purpose as antioxidants butylated hydroxyanisole, nordihydroguaiaretic acid (so called N.D.G.A.), tocopherols, esters of gallic acid and as synergists citric acid, phosphoric acid or salts of both acids, lecithine, ethylenediamine tetraacetic acid or a salt thereof.

In order that the antioxidants function as effectively as possible they were mixed with the vitamins to form a homogeneous phase for example by dissolving the antioxidants in a vitamin A and/or D containing oil or by melting a mixture of crystalline vitamin A and/or D and antioxidants.

In order to simplify the language of the application the term "vitamin phase" will be used for crystalline vitamin A or D, for mixtures of these vitamins as well as for solutions of these vitamins in oil.

The term "oil" is to be understood to mean esters of higher fatty acids with glycerine or mono- and bivalent alcohols, free fatty acids, and hydrocarbons, provided that all these substances are liquid at least above 80° C.

As a rule the antioxidants were added in a percentage by weight varying between 0.05 and 0.001 to the vitamin phase.

Higher concentrations of antioxidants were, generally, not employed since it has been found that in this case the vitamins to be stabilized are decomposed rather rapidly.

In general, the stability of the aforesaid dry vitamin preparations, soluble in fat or in water, if they were kept in air, may be considered to be satisfactory mainly, because of the use of antioxidants and synergists.

If, however, these preparations were diluted by mineral mixtures or protein concentrates for feed purposes or feed mixtures, for example to a degree of 1:1000 or more and if such mixtures are kept in an atmosphere at room temperature with a relative humidity higher than 55%, it has been found that, after a storage period of six months, as a rule the initial vitamin content has decreased considerably.

The term "mineral mixtures" is understood to mean herein mixtures of fodder salts, consisting mainly of salts of calcium and phosphates and containing furthermore trace elements. These mixtures are, as a rule, added in a ratio of 1% to 5% by weight to animal feed. The term "protein concentrate" is understood to mean mixtures of animal protein and mineral mixtures, also intended to be added to feed, in a ratio of about 1:10. Such a protein concentrate may, for example, consist of 40% of fish meal, 40% of blood meal and 20% of a mineral mixture.

In accordance with the invention it is now possible to produce dry and free flowing vitamin A and/or D preparations, which, after having been mixed with mineral mixtures or protein concentrates, in dilutions of 1:1000 or more, and being kept at room temperature in air having a relative humidity of at least 55%, have a vitamin content of at least 60% of the initial vitamin content after a six months' storage period. The preparations according to the invention are termed hereinafter "mineral stable preparations."

The invention relates to a method of producing dry, free flowing and mineral stable vitamin A and/or D preparations and is characterized in that to a vitamin A and/or D phase is added at least 2 grams of 4-methyl 2,6-ditertiary butylphenol (ionol) per 100 S.U. of the vitamin, this mixture in the molten or liquid state is dispersed in an aqueous liquid containing a jellifiable, film-forming colloid and this aqueous emulsion is worked up to obtain small dry particles.

Even very high amounts of the mentioned antioxidants may be added to the vitamin phase without causing a harmful effect. The maximum effect is well reached when 150 gr. of ionol per 100 S.U. of vitamin A and/or D are added to the vitamin phase. As has been stated, higher amounts of the antioxidants may be added but this does not involve a higher stability of the vitamins. The expression "S.U." means standard units. One S.U. equals $1 \times 10^6$ international units.

Amounts of 25 to 50 gms. of ionol per 100 S.U. of vitamin A and/or D give very satisfactory results.

In accordance with a preferred embodiment of the invention 50 to 150 gms. ionol per 100 S.U. of vitamin A and/or D are added to the vitamin phase.

In practice the concentration of vitamin A and/or D in the vitamin phases differ widely, thus one may have low concentrated vitamin phases containing about 0.05 to 0.15 S.U. of vitamin A and/or D per gram of vitamin phase as well as the more medium concentrated vitamin phases containing between 0.15 to 1 or 1 to 2 S.U. of vitamin A and/or D. The higher concentrated vitamin phases have a vitamin content of 2 or more S.U. vitamin A and/or D per gm. (1 gr. of vitamin A alcohol equals 33 S.U., 1 gr. of vitamin $D_3$ equals 40 S.U.).

Depending upon the concentration of the vitamins A and/or D in the phases the amount of antioxidant added may vary.

As jellifiable, film-producing colloids use may, for example, be made of proteins, for example gelatine, blood albumine, lactalbumine and the like. For this means, use may furthermore be made of carboxymethylcellulose, methylcellulose or starch.

According to a further preferred embodiment of the invention the aqueous emulsion contains, in the homogeneous phase, not only a jellifiable colloid, but also one or more carbohydrates, for example lactose, glucose, maltose, saccharose, starch or partly hydrolysed products of starch.

It is advantageous to choose the aqueous emulsion to be such that it is liquid at a temperature of about 60° C., but solid at room temperature. An emulsion preferably used contains per gram of dry substance 0.4 to 0.6 gr. of jellifiable colloid, for example gelatine (or pectin), 0.3 to 0.15 gr. of a carbohydrate, for example lactose or glucose, 0.1 to 0.5 S.U. vitamin A and/or D, and 0.05 to 0.5 gr. of ionol. In the aqueous phase of the emulsion there may be dissolved also vitamins, soluble in water, antioxidants or synergists, for example vitamin C, vitamins of the B-complex, citric acid, and lecithine.

In order to obtain dry, solid particles from the emulsion various methods may be used, for example the warm emulsion is extended on flat plates or poured out into moulds. Subsequent to cooling the solidified emulsion is divided into particles of the desired size, which are then dried. The emulsion may furthermore be applied to heated, rotating cylinders, the water being evaporated and the emulsion dried. The dried emulsion may be removed from the rotating cylinders by scraping irons. If desired, this treatment may be followed by grinding.

In accordance with a preferred embodiment of the invention, the aqueous emulsion while warm and liquid is dispersed in an oil in which the emulsion does not substantially dissolve, for example in castor oil or paraffin oil. When the dispersed emulsion has been cooled and has solidified, it is separated from the oil. This step may be carried out easily by dissolving the oil in a suitable solvent. The solvent should be chosen such that the substances contained in the homogeneous phase are not substantially dissolved. For this purpose use may be made of hexane, acetone, ligroin. Use is preferably made of those solvents which can be mixed with water, so that they may have a drying effect on the solidified emulsion. Solvents suitable for this purpose are lower aliphatic alcohols, for example ethanol, isopropyl alcohol, furthermore acetone, methyl ethylketone and n-propanol.

With some solvents the water insoluble constituents of the solidified emulsion are dissolved to an undesirable degree. This may cause loss, among other things, of the antioxidants. In order to prevent these losses the solvent used contains these substances added in such a manner so that they are not extracted from the solidified emulsion. Thus as solvents there may be used lower aliphatic alcohols in which ionol is dissolved together with carbohydrates.

In accordance with another preferred embodiment of the invention the emulsion is sprayed dried in a room filled with a hot gas, the maximum temperature being at least 120° C.

The preparations according to the invention are very suitable to be mixed with feed preparations containing minerals and trace elements in any ratio. The preparations are furthermore excellently suitable to be worked up in the forms of tablets, pills and the like for pharmaceutical purposes.

*Example I*

A melt was made of 754 grs. of vitamin A acetate (having a vitamin A content of 2.5 S.U. per gram) and 996 grs. of ionol. The melt, which has a temperature of 60° C., was emulsified in 10 kgs. of an aqueous solution, containing 4 kgs. of gelatine, 1 kg. of glucose, 5 grs. of citric acid, 9 grs. of polyoxyethylene sorbitan mono oleate ("Tween 80").

The emulsion was homogenized at a temperature of 65° C., until the dispersed particles had a size of about 5μ.

Then the emulsion was dispersed in an equal amount of castor oil, at a temperature of 55° C. After this double emulsion had been cooled to a temperature of 5 to 10° C., the castor oil was dissolved in isopropyl alcohol. The solidified particles were filtered off and washed subsequently a few times with isopropyl alcohol and dried in a flow of warm air of 32° C. The content of dry substance of the preparation thus obtained was 95% and the vitamin A content was 0.3 S.U. per gram.

Part of this preparation was mixed homogeneously with 3000 parts of a mineral mixture containing 41.23% of calcium carbonate, 15% of steamed bone meal and 13% of dicalcium phosphate, 20% of iodized sodium chloride, 10% of magnesium sulfate, 0.5% of ferrous sulfate, 0.15% of copper sulfate, 0.1% of maganese sulfate and 0.02% of cobalt sulfate. In this mixture the vitamin A concentration was $10^{-4}$ S.U. per gram. For six months this mixture was kept under atmospheric conditions at room temperature. After this period the vitamin A content was $0.93 \times 10^{-4}$ S.U. per gram. The vitamin A content decreased slightly during the next two months and was after 8 months $0.89 \times 10^{-4}$ S.U. per gram.

A further part of the vitamin preparation described in the beginning of this example was mixed in a ratio of 1:4000 with a protein concentrate consisting of 10% of soybean meal, 45% of fish meal, 20% of blood meal, 10% of sunflower seed meal, 15% of a mineral mixture. This mineral mixture consisted for 50% of calcium carbonate, 32.5% of steamed bone meal, 15% of iodized sodium chloride, 1.6% of ferrous sulfate, 0.3% of copper sulfate, 0.6% of manganese sulfate. This mixture was kept at room temperature in a room having a relative humidity of 75%. After four months and a half the vitamin A content was still 94%, after six months 76% of the initial vitamin A content.

*Example II*

A mixture of 3.6 kgs. of gelatine, 4.8 kgs. of glucose, 0.24 kg. of secondary sodium phosphate, 0.205 kg. of primary sodium phosphate, 7 grs. of citric acid and 30 grs. of disodium salt of ethylene diamine tetra acetic acid was dissolved in 30 litres of water. In this solution was dispersed 1.1 kgs. of a liquid mixture of 495 grs. of ionol and 623 grs. of soybean oil with 1.45 S.U. vitamin A palmitate per gram.

The aqueous emulsion was homogenized until the particle size in the dispersed phase was 1 to 2μ. This emulsion was sprayed in hot air in a drying tower, in which the maximum temperature was about 160° C. and the minimum temperature about 70° C. so that the sprayed drops dried immediately after they had been produced and small, solid particles were obtained. The preparation thus obtained had a vitamin A content of 0.085 S.U. per gram.

The preparation was mixed in a ratio by weight of 1:1000 with a mineral mixture as described in Example I. This mixture was kept in air with a relative degree of moisture of 74% at room temperature. After four months the vitamin A content was 88%, after six months 76% of the initial vitamin A content. Another part of the vitamin preparation was mixed with a protein concentrate of the same composition as mentioned in Example I, also in a ratio of 1:1000. The storage conditions were the same. After four months the vitamin A content was 76%, after 6 months 65% of the content at the beginning of the experiments.

*Example III*

An aqueous emulsion was made, containing 48% of dry substance. The composition of the dry substance was as follows: 15% of soybean oil in which vitamin A is dissolved to a concentration of 1.5 S.U per gram, 1.2% of soybean oil in which vitamin D3 had been dissolved to a potency of 2 S.U. per gram, 15% of ionol, 45.0% of gelatine, 23.68% of glucose, 0.05% of disodium salt of ethylene diamine tetra-acetic acid, 0.07% of citric acid. The percentages are by weight.

This aqueous emulsion was worked up to obtain a dry preparation in the same manner as described in Example I. The vitamin A and D3 content of this preparation was 0.225 and 0.024 S.U. per gram respectively.

The preparation, in a ratio by weight of 1:2000 was mixed with a mineral mixture and with a protein concentrate of the compositon described in Example I. This preparation was kept in air with a relative degree of moisture of 75%. After six months the vitamin A content in the mixture with minerals and protein concentrate was 93% and 89% respectively. The vitamin D content had apparently not decreased.

When in the same vitamin preparation in the same manner prepared as in this example described as antioxidant, 15% of 2.2'methylene bis 4-methyl, 6-tertiary butyl phenol instead of ionol was used under the same conditions as the aforesaid preparation, the vitamin content was, after having been kept for six months, only 52% in the mineral mixture and not more than 39% in the protein concentrate with respect to the initial vitamin A content. Moreover, the vitamin D3 content had decreased materially.

*Example IV*

To a solution of 1.25 kgs. of pectin in 33 litres of water there was added a homogeneous mixture of 1.25 kgs. of whale oil containing 0.647 S.U. vitamin A per gram, 8.6 grs. of oil containing 5 S.U. of vitamin D3 per gram, 25 grs. of lecithine and 2 grs. of nordihydroguaiaretic acid: this mixture was homogenized.

To this emulsion was added a solution of 8.7 kgs. of maltose syrup and dextine (total weight of dry substance 7.46 kgs.) in 9.06 kgs. of water. The emulsion was re-homogenized and then sprayed in a so-called "Krause" spray drying apparatus. The maximum temperature in the drying tower was 155° C. and the minimum temperature 103° C. The rotating disk of the spray dryer performed 8000 revolutions a minute. The dry vitamin A prepartion obtained by this method had a vitamin A content of 0.08 S.U. per gram.

When this preparation was diluted with a mineral mixture in a raito by weight of 1:9 and this mixture was kept at room temperature in air of a relative humidity of 25%, the vitamin A content was still 75% after two months and 65% after four months with respect to the initial content. However, when the dry vitamin preparation was mixed in a dilution of 1:100 with minerals or in a ratio of 1:1000, only 55% of the initial vitamin A content was left in the first mixture after one month and about 5% in the second mixture after two months. If the relative humidity of the air was 63%, the vitamin A content decreased even more rapidly.

However, when to the vitamin phase was added, instead of lecithine and nordihydroguaiaretic acid 37.7 grs. of ionol per 100 S.U. vitamin A, it was found that in a dilution of 1:1000 with a mineral mixture the preparation had lost not more than 30% of the initial vitamin A content, after having been stored for six months at room temperature in air of a relative humidity of 75%.

*Example V*

A product was prepared according to the method described in Example I having the following composition: 10.8% of vitamin A acetate (this acetate contained about 2.5 S.U. per gram), 17.2% of ionol, 56% of gelatin, 16% of glucose. (The concentration of ionol calculated on the base of vitamin alcohol was 200%.)

This preparation had a vitamin A content of 264,000 I.U. per gram. Stored as such, no loss of vitamin A was found after 6 months. If the dry product was mixed in a ratio of 1:650 with cattle minerals a loss of only 10% of vitamin A was found after 6 months. Vitamin A was retained for 70% when the preparation was mixed in a ratio of 1:550 with and stored for 6 months.

*Example VI*

According to the process as described in Example I a preparation was made containing 10.8% of vitamin A acetate (this ester containter 1.13 S.U. per gram), 17.2% of ionol, 55.9% of gelatin, 16% of glucose, 0.1% of citric acid. The prepartion contained 400% of ionol when the percentage was calculated on the amount of vitamin A (as vitamin A alcohol).

Stored as such no loss of vitamin A was found after 6 months. Mixed with cattle minerals in a ratio of 1:375 the retention of vitamin A was 85% after 6 months.

What is claimed is:

1. A method of producing dry, free flowing, mineral stable, vitamin preparations comprising the steps of forming a homogeneous liquid mixture of at least one vitamin selected from the group consisting of vitamin A and vitamin D and mixtures thereof and, as a stabilizer, 4-methyl 2,6-ditertiarybutylphenol in an amount of at least about 2 grams per 100 S.U. of the vitamin, dispersing this mixture in an aqueous liquid containing a jellifiable filmforming organic colloid, and dehydrating the resultant emulsion to thereby obtain small, dry, vitamin containing particles.

2. The method of claim 1 in which the amount of the 4-methyl 2,6-ditertiarybutylphenol is from about 25–50 grams per 100 S.U. of the vitamin.

3. The method of claim 1 in which the amount of the 4-methyl 2,6-ditertiarybutylphenol is from about 50–150 grams per 100 S.U. of the vitamin.

4. The method of claim 1 in which a carbohydrate is added to the emulsion.

5. The method of claim 4 in which the aqueous emulsion contains per gram of dry substance about 0.4 to 0.6 gram of a jellifiable colloid selected from the group consisting of gelatine and pectin, about 0.3 to 0.15 gram of a carbohydrate selected from the group consisting of lactose and glucose, about 0.1 to 0.5 S.U. of at least one vitamin selected from the group consisting of A and D, as a stabilizer 4-methyl 2,6-ditertiarybutylphenol, in an amount of from 0.05 to 0.5 gram and an edible oil having a solidification temperature at least above 80° C. in amount sufficient to form one gram of dry substance.

6. The method of claim 5 in which the emulsion is dehydrated and the dry particles formed by warming the aqueous emulsion, dispersing the warm, aqueous emulsion in an oil in which the emulsion is insoluble and in which the emulsion separates into solid particles, separating the oil from these particles and freeing these particles of any adhering oil by washing them with a solvent for the oil in which the solid constituents of the emulsion are at least partially insoluble.

7. The method of claim 6 in which the solvent for the oil is miscible with water.

8. The method of claim 6 in which at least one of the dry constituents other than the vitamin and jellifiable colloid is dissolved in the solvent for the oil.

9. The method of claim 1 in which the aqueous emulsion is sprayed into a hot gas having a temperature of at least 120° C. to thereby cause the formation of dry small solid particles.

10. A dry, free flowing, mineral stable vitamin preparation comprising at least one vitamin selected from the group consisting of vitamins A and D, a jellifiable, film forming colloid, a carbohydrate and, as a stabilizer, 4-methyl 2,6-ditertiarybutylphenol, in an amount of at least about 2 grams per 100 S.U. of vitamin present.

11. A dry, free flowing, mineral stable vitamin preparation comprising at least one vitamin selected from the group consisting of vitamins A and D, a jellifiable organic film forming colloid, a carbohydrate and, as a stabilizer, 4-methyl 2,6-ditertiarybutylphenol, in an amount of at least about 50–150 grams per 100 S.U. of vitamin present.

12. A dry, free flowing, mineral stable vitamin preparation comprising at least one vitamin selected from the group consisting of vitamins A and D, a jellifiable organic film forming colloid, a carbohydrate and, as a stabilizer, 4-methyl 2,6-ditertiarybutylphenol, in an amount of at least about 3–24 grams per 100 S.U. of vitamin present.

13. A dry, free flowing, mineral stable vitamin preparation containing per gram of dry substance about 0.3–0.15 S.U. of at least one vitamin selected from the group consisting of vitamins A and D, about 0.4–0.6 gram of a jellifiable organic colloid selected from the group consisting of gelatine and pectin, about 0.3–0.15 gram of a carbohydrate selected from the group consisting of lactose and glucose, as a stabilizer, 4-methyl 2,6-ditertiarybutylphenol, in an amount of about 0.05–0.5 gram and an edible oil having a solidification temperature at least above 80° C. in an amount sufficient to form one gram of dry substance.

14. An animal feed comprising a mixture of one part of the vitamin preparation of claim 10 and at least 1000 parts of mineral and protein containing animal foodstuff.

References Cited in the file of this patent

UNITED STATES PATENTS

| | | |
|---|---|---|
| 2,183,053 | Taylor | Dec. 12, 1939 |
| 2,218,591 | Taylor | Oct. 22, 1940 |
| 2,218,592 | Taylor | Oct. 22, 1940 |
| 2,650,895 | Wallenmeyer | Sept. 1, 1953 |
| 2,676,136 | Myhre | Apr. 20, 1954 |
| 2,693,435 | Stieg | Nov. 2, 1954 |
| 2,708,628 | Banernfeind | May 17, 1955 |
| 2,756,177 | Cannalonga | July 24, 1956 |